No. 812,764. PATENTED FEB. 13, 1906.
J. E. MITCHELL.
METHOD OF TREATING FLOUR.
APPLICATION FILED SEPT. 24, 1904.
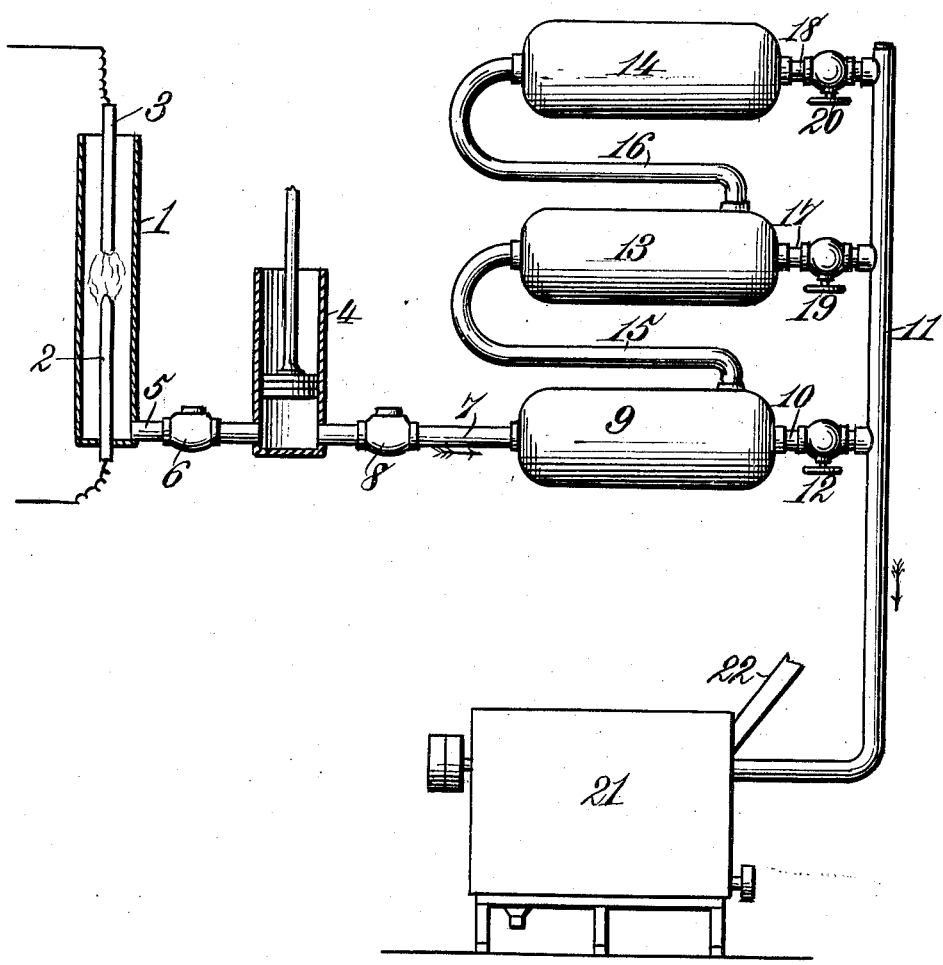

UNITED STATES PATENT OFFICE.

JOHN E. MITCHELL, OF ST. LOUIS, MISSOURI, ASSIGNOR TO ALSOP PROCESS COMPANY, OF ST. LOUIS, MISSOURI, A CORPORATION OF MISSOURI.

METHOD OF TREATING FLOUR.

No. 812,764.    Specification of Letters Patent.    Patented Feb. 13, 1906.

Application filed September 24, 1904. Serial No. 225,849.

*To all whom it may concern:*

Be it known that I, JOHN E. MITCHELL, a citizen of the United States, residing at St. Louis, in the State of Missouri, have invented new and useful Improvements in Methods of Treating Flour, of which the following is a specification.

This invention relates to a novel process for preparing gases, and has reference especially to the treatment of the gaseous medium or mediums produced by means of the electrical discharge in air.

In effect, my invention aims to improve the process described and claimed in Letters Patent No. 759,651, granted May 10, 1904, to James N. Alsop. According to said process air as modified by the flaming electric discharge is conducted almost immediately from the electrifying apparatus into the presence of the flour to be treated. As a result the flour is very greatly improved in many particulars, the most noticeable improvement being in the color, which is very much whiter than that of the ordinary flour of commerce. I have for some time known that the bleaching effect the gas has upon the flour is not nearly so great in the pipe near the electrical apparatus where the gas is generated as it is near the agitator where the flour is treated and that the bleaching power of the gas discharged from the outlet of the agitator is greater than that of the gas entering the agitator. In brief, I have discovered that the properties of the gaseous medium produced by the Alsop apparatus to improve flour are greatly enhanced if said medium be stored or its passage to the flour retarded for an appreciable length of time. I have found that five or six minutes' time is required after the air leaves the electrifying apparatus before it possesses the maximum efficiency for the improvement of flour. A less time of storage or of retardation will in practice frequently answer, owing to the condition of the atmosphere as to temperature and moisture and to the character of the flour being treated. As in all processes of this character, something must be left to the skill and discretion of the operator to secure the best results. The question of the length of storage or retardation can be readily determined, however, by an inspection of the flour being treated. If a single storage-tank be employed, the requisite variation is effected by shutting off part of the current, so that the air will be modified to a less extent by the discharge and the gaseous medium be less intense in its action. Furthermore, I have discovered that marked improvement in the quality of the gas so far as its availability for the treatment of flour is concerned is effected by the discharge thereof into a tank or other closed receptacle of sufficient size to permit of a thorough diffusion of the gas therein.

It is possible that the improvement effected in the gaseous medium by the interposition of a holder or receptacle in the conduit leading from the pump to the agitator where the flour is treated is due to several causes. I suggest the following reasons:

First. As all of the modified air as drawn from the electrifying apparatus is pumped into a common reservoir where a thorough intermingling may take place, the gaseous medium discharged from the reservoir will have the maximum uniformity of quality.

Second. The various gases which constitute the gaseous medium produced by the flaming electric discharge in air having different specific gravities, it is possible that by first discharging this gaseous medium into a holder or reservoir and continuously supplying said reservoir with fresh quantities of the gaseous medium the various constituents of said medium tend to find their respective levels in the reservoir, and with each influx of fresh gas the various constituents thereof combine with the like constituents already in the reservoir, so that there is effected a condensation or increase of volume of the effective gases, which are subsequently forced into the agitator containing the flour. This would result or may result in a larger volume of the effective gases being supplied to the flour in a given time than is the case where the air as modified is discharged practically immediately into the presence of the flour.

Third. It is possible that by first storing the gas for a short time before passing it to the flour opportunity is given for atoms of like gases to combine or for other chemical combinations or chemical reactions to occur, which results in the improvement of the gaseous medium.

Fourth. By discharging the gaseous medium into a reservoir I secure practically a continuous discharge thereof into the agitator in place of an intermittent discharge, as has heretofore been the case, so that the flour is subjected more uniformly to the action of the gas.

Fifth. By storing the gases or retarding their passage to the flour said gases will be permitted to cool, and it is possible that the cooled gases are more efficacious in their action upon the flour than are the gases when relatively hot or even warm.

The tank or reservoir employed should be of a suitable size to hold or retard the flow of gas a sufficient length of time to allow it to attain its greatest efficiency before it enters the agitator, and by the time it reaches the agitator its purifying and bleaching qualities are so great that but very little of the gas is required in treating flour as compared with the quantity required when the connections are made direct from the pump to the agitator.

In practicing my process I may employ a single tank for receiving the gaseous medium or two or more similar tanks connected in such manner that the gas can be caused to pass through as many of the tanks as desired before it is permitted to enter the agitator, whereby I am enabled to regulate the length of time during which the gas is retarded in its passage to the flour. The single tank which I employ is cylindrical in shape and approximately six feet in height by three feet in diameter. If two or more tanks are employed, their combined capacity should be about equal to the capacity of a single tank.

Having thus outlined the purposes of my invention and the advantages to be derived therefrom, I will now proceed to describe the same more in detail in connection with the accompanying drawing, which illustrates, partly in section and partly in elevation, a form of apparatus capable of permitting the process contemplated to be carried out.

Referring to the drawing, 1 indicates the air-tube, in which are located the electrodes 2 and 3.

4 indicates the pump for drawing air through the tube 1, for which purpose it is connected with the tube by means of pipe 5, provided with a check-valve 6.

7 indicates the outlet-pipe from the pump, which is provided with a check-valve 8. The pipe 7 leads to and is connected with one end of a tank 9, and from the opposite end of said tank a pipe 10 leads to a conduit 11 and is provided with a valve 12.

13 and 14 indicate tanks similar to tank 9, a pipe 15 connecting one end of the tank 9 with the opposite end of the tank 13 and the pipe 16 connecting one end of the tank 13 with the opposite end of the tank 14. Pipes 17 and 18, respectively, connect the tanks 13 and 14 with the conduit 11 and are provided with valves 19 and 20.

21 indicates the agitator, into which flour is admitted at 22 and is gradually forced through the agitator and discharged at the opposite end thereof.

In practice if it be desired to use a single tank only valves 19 and 20 are closed and valve 12 is opened. Air is drawn through the tube 1, and after being subjected to the action of the discharge which occurs between the electrodes 2 and 3, is drawn through the pipe 5 into the pump-cylinder and then forced out through the pipe 7 into the tank 9. From the tank 9 it passes through the pipe 10 to the conduit 11, whence it enters into the agitator 21 and comes in contact with the flour. If it be found that the size of the tank 9 or the length of the same be not sufficient to afford the requisite time for the gaseous medium to attain its highest efficiency, I may close the valve 12 and open the valve 19 and force the gas to pass up through the pipe 15 into the tank 13 and then out through the pipe 17 to the conduit 11. In like manner I can close both the valves 12 and 19 and open valve 20 and cause the gas to pass through the tanks 9, 13, and 14 out through the pipe 18 to the conduit 11. It will be evident that each volume of gas will not be discharged directly from the tank, but only after succeeding volumes of gas have been forced into the tank. During this operation all of the gases are thoroughly intermingled in the tank, and possibly, as stated, new chemical combinations or more perfect combinations of the constituent elements of the gaseous medium occur.

Having thus fully described my invention, what I claim as new, and desire to secure by Letters Patent of the United States, is—

1. The method of treating flour, which consists in subjecting air to the action of the flaming electric discharge, retarding the passage of the modified air to the flour for an appreciable length of time, and then conducting the modified air into the presence of the flour.

2. The method of treating flour, which consists in subjecting air to the action of the flaming electric discharge, storing the modified air for an appreciable length of time, and then conducting the same into the presence of the flour.

3. The method of treating flour, which consists in subjecting air to the action of the flaming electric discharge, passing the air as thus modified into an inclosed space and delaying its passage therethrough until the desired cooling and interdiffusion of the constituent gases have occurred, and finally subjecting to its action the flour to be treated.

4. The process of treating flour, which consists in producing a gaseous mixture containing oxids of nitrogen, delaying the passage of said gaseous mixture to the flour for an appreciable length of time, and then subjecting the flour to the action of the resultant gas or gases.

5. The process of treating flour, which consists in producing synthetically gaseous oxids of nitrogen, delaying the passage of the gaseous medium to the flour for an appreciable length of time and then subjecting the flour to the action thereof.

In testimony whereof I have hereunto set my hand in presence of two subscribing witnesses.

JOHN E. MITCHELL.

Witnesses:
J. N. BONNER,
MARK MAITLAND.